United States Patent [19]

Othmer

[11] 4,151,075
[45] Apr. 24, 1979

[54] SEPARATION OF COMPONENTS OF A FLUID MIXTURE

[76] Inventor: Donald F. Othmer, 333 Jay St., Brooklyn, N.Y. 11201

[21] Appl. No.: 694,954

[22] Filed: Jun. 11, 1976

[51] Int. Cl.² ............................................. C02C 1/06
[52] U.S. Cl. ........................................ 210/7; 210/50; 210/63 R; 210/83
[58] Field of Search ................... 210/83, 84, 521, 522, 210/513, 42 R, 44, 50, 3, 4, 7, 8, 59, 60, 63 R

[56] References Cited

U.S. PATENT DOCUMENTS

| | | | |
|---|---|---|---|
| 2,077,057 | 4/1937 | Poole | 210/521 |
| 2,879,895 | 3/1959 | McLain | 210/521 |
| 3,385,439 | 5/1968 | Bach | 210/83 |
| 3,399,135 | 8/1968 | Cowley | 210/521 |
| 3,710,949 | 1/1973 | Murkes | 210/522 |
| 3,772,187 | 11/1973 | Othmer | 210/7 |
| 3,797,668 | 3/1974 | Pielkenrood et al. | 210/522 |

FOREIGN PATENT DOCUMENTS

| | | | |
|---|---|---|---|
| 895874 | 6/1943 | France | 210/521 |
| 48815 | 6/1940 | Netherlands | 210/521 |
| 64378 | 10/1949 | Netherlands | 210/521 |

*Primary Examiner*—Frank Sever

[57] ABSTRACT

Fluid mixtures containing a carrying liquid as water and solid particles or oil, or both may be separated in a settling treatment by being passed through channels between plates which are tilted so that one side of all plates is lower than the other, whereby the more dense phase concentrates on the lower side to discharge therefrom as a stream containing at least most of the solid particles, if that represents the more dense phase; and clear water discharges substantially free of particles from the upper side of the channels. While accomplishing the separation of phases the process may simultaneously and rapidly destroy organic materials in waste liquors, such as sewage waters, by utilizing an oxidation depending on (a) pressure treatment to supply more oxygen in solution from air and/or oxygen that is obtainable under atmospheric pressure, (b) the utilization of this oxygen to supply BOD and COD in the liquid, due to strictly chemical, enzymatic, and/or aerobic reactions, (c) the depressurization to eliminate dissolved gases, and (d) the continuation of these steps to obtain less polluted effluent water.

41 Claims, 10 Drawing Figures

SEPARATION OF COMPONENTS OF A FLUID MIXTURE

BACKGROUND

Well known in the sanitation, chemical, and petroleum industries is the separation of the phases of a fluid mixture by the sedimentation of particulant solids and the removal of oils lighter than water and undissolved gases by operations known as clarifying, decanting, settling, or simply, phase separating. In some more recent types of separation called here simply plate settling, the waste liquors containing solid particles flow through the horizontal lamellar spaces or channels between flat horizontal, parallel plates when assembled in a pack, as a pack of cards, each spaced at a slight distance from the next, longitudinal axis at an angle, and top and bottom edges parallel with the horizontal.

Relatively rapid settling or sedimentation of particulate solids as a sludge phase is accomplished while separating out a clear liquid phase, usually water. Or the same plate settling may be used simply for the decantating as a light liquid phase of oils, which term includes other liquids which are insoluble with and lighter than water. In other cases, both operations proceed simultaneously while undissolved gases may also rise to the surface; and the light phase may include a froth of light, flocculent solid particles which may have been entrained with sufficient bubbles of gases to make them float, while denser solids are concentrated at the bottom and removed as the sludge phase.

The term "phase" as used here is not applied in the true chemical sense; instead it means a "layer" of material having a more or less definite interface with another layer. Thus "aqueous" or "water" phase may be used to mean the relatively particle free and droplet free bulk layer principally of the carrying water—usually a solution of soluble materials; "sludge phase" may mean the heavier solid-slurry of particles; and the "oil" or "froth" phase may mean a phase with an apparent density less than that of the water phase, such as the lighter mixture or suspension of oils, lighter solids, and entrained gas bubbles or indeed gases alone; and it may be called simply the "light" phase, particularly if it is partly or entirely gaseous. A "fluid" mixture is one which may contain in addition to a liquid—usually water—other liquids and undissolved gases, also suspended solids but not in such large amounts as would prevent flow of the mixture in channels.

Previously described also has been the Pressure-Recycling Oxidation Sewage Treatment which includes the sedimentation or settling out of solid particles as a sludge simultaneously with the circulation of an influent of waste liquors as sewage to which air or oxygen is being supplied to satisfy a chemical oxygen demand (COD) and a biological oxygen demand (BOD). After preliminary screening and comminution of solids, the cycle may involve—first, a pressurizing with an oxygen containing gas to obtain a much greater solubility, concentration and activity of oxygen at the high pressures, compared with those at atmospheric pressure; second, an oxidation of organic components—often with a simultaneous sedimentation of insoluble particulate solids as a sludge; third, a depressurization with a release of dissolved gasses; fourth a recycling back to the influent of some part of the treated liquor and/or the sludge if formed and separated; and fifth, a withdrawal of a more pure effluent. This treatment is described in U.S. Pat. Nos. 3,772,187 and 3,788,476.

SUMMARY OF THE INVENTION

When accomplished with a simultaneous separation of sludge the Pressure-Recycling Oxidation Sewage Treatment (after preliminary screening, comminution of solids, and grit removal where necessary) has been found to be greatly improved by taking advantage of the high settling and clarification rates which are obtained by the improved plate type settling as described herein. This improved plate settling is advantageous also in many other separations of two or three phases from a fluid mixture containing solid particles, liquids, and undissolved gases, in the sanitary, chemical, and metallurgical industries. Plates are generally between 5 and 8 feet long although shorter lengths down to 3 feet may give satisfactory results with some separations, and lengths up to 10 feet may be advantageous in others. Under the conditions found in handling usual wastes in water, experience has shown that the best plate spacing is such as to give intermediate lamellar channels of about $\frac{1}{2}"-2\frac{1}{2}"$ thickness—the vertical dimension or height of the channel will be somewhat greater than the channel thickness because of the inclination of the plates. The channels of this invention, between their respective upper and lower plates are always completely enclosed passageways with a wall on either side, thus all material being processed must enter and leave at the only openings, the ends.

The angle of flow with the vertical of the liquid during plate settling in the channels to give optimum separation efficiency and capacity in conventional practice depends on the dimensions of the channels, also on several hydraulic factors such as the viscosities of fluids and their rates of flow, also on the settling rates of the aqueous phase with the sludge and/or froth phases. The angle of flow, or of the longitudinal axis of the flat plates in the pack is between about 15°–75° with the vertical; and the best angle will usually be between 30° to 60° with the vertical. The steeper angles (i.e. 15° to 30° with the vertical) may be used when there is countercurrent flow of sludge to rising liquid; and a solid-liquid contacting action is desired; and angles of 60° to 75° with the vertical may be used when the rate of settling is low.

It has been found that performance is better sometimes if the channels expand in thickness throughout their length, by as much as 10 to 25%. Particularly if a light phase is rising due to gas bubbles; these expand as the hydrostatic head is reducing; and an increase in cross section of the channel prevents an increase in velocity.

Conventionally, plate settling for separation of a sludge phase is operated with the flow through the channels along their longitudinal axis being conducted at an angle with the vertical which is greater than the angle of repose in water of the solid particles which collectively make up the sludge phase. Also it has always been desired in practice to date in using plate settling or decanting to maintain a uniform flow from left to right across the width of the narrow channels between horizontal plates which thus bound channels, the center line of whose cross sections are always parallel. This also maintains parallel lines of flow of sludge phase and of the water phase in any unit of width of the cross section—which may be called a lane—although sometimes these lines of flow are in opposite directions.

These parallel lines of flow characteristics of all phases have heretofore been maintained by having the pack of plates so supported that they are horizontal at top and bottom edges—for either influent or effluent—also every other line at right angles to their longitudinal center lines is also horizontal. This horizontal cross section of the channels controls the lines of flow of the particles making up the part of the sludge phase so that in present practice they are always parallel with the stream lines of the aqueous phase; and both sludge particles and liquid flows are parallel to the longitudinal axis of the plate. (In some cases conventionally, while the lines of flows of sludge and of aqueous phases are indeed parallel, the flows are in opposite directions. In particular, this is the case with a sludge heavier than water being decanted from water flowing upward in the channels. Thus lines of flow herein are called parallel even if in opposite directions.)

However, now it has been found that the rate of separation by plate type settling and particularly the completeness of separation of the phases is greatly improved if the channels of flow and thus the plates, are tilted so that lines on the plates—or the effective center lines of the channels, if the plates are not flat—and which are at right angles to the longitudinal center line are not horizontal, as heretofore. This improvement is effective in the many uses of plate settling for separation of two or three phases including the use in combination and simultaneous with the oxidation of organic materials in sewage liquids. Thus a much better separation than previously possible in a plate type settling may be achieved of the sludge phase from an aqueous phase, and of the froth or oil phase—if such there be—from an aqueous phase.

To accomplish this major improvement in plate settling, the plates or the plate pack are simply tilted or rotated, around the longitudinal axis, through such an angle that the settling of the heavier sludge phase from the bulk phase of the carrying aqueous liquid displaces this sludge not only to the bottom of the lamellar channel of flow but also to one side of the entire cross section of the channel of flow. Also if there is being separated a lighter than water layer such as an oil or froth phase, this is displaced to the opposite side of the entire cross section of the lamellar channel of flow, as well as to the top of the flow through the channel between plates.

For best results, the plates should be tilted so that these lines at right angles with the longitudinal center line of the plate—and thus the cross sections of the lamellar channels and the flows therein—are at an angle of 1° to 20° with the horizontal, with the angle giving the best results usually being between about 2° and 10°. When the flow in the channels is thus tilted downwardly to the right when looking from above, the general flow pattern of the solid materials of the sludge through the channel tends to slip downwardly at the steepest angle on the surface of the plate and thus to veer to the right of the channel, from having flow lines parallel with the longitudinal axis of the plate, and a uniform distribution left to right of solids being separated, as in conventional practice.

The solids which form the sludge phase, are denser and thus are more affected by this component of gravity added by this new tilting of the channels than is the less dense water phase. Therefore the particles of solids making up the sludge phase tend to flow at an angle with the flow of the liquid phase and to concentrate or become more dense—less water—at the right of the entire cross section of each lamellar channel between successive pairs of plates. The line of flow of the solids tends to be at the angle with the vertical of the steepest line which could be drawn on the plate; and this could be developed geometrically from the angle of the axis of the plate with the vertical and the angle with the horizontal of a line perpendicular to the axis. However, in practice this is greatly influenced by the relative densities of the two phases, by the velocities of flow rates and of settling, and by other hydraulic considerations.

By itself this increase in density by compacting of the sludge particles is a great improvement in the overall separating action; but of greater importance is the fact that the sludge phase as a whole concentrates into a more definite and more dense stream of somewhat consistent cross section as it spills off the bottom edges of the plates into the lower chamber where the sludge is withdrawn.

Conventionally, sludge particles fall off the lower horizontal edges of the plates as individual particles, small individual masses, or loose agglomerations; and these have to fall through the continuous water phase. The fall itself and any convection or other agitation, particularly that of disengagement from the stream of the aqueous phase, and also that of the mixing action of the channel next behind which discharges directly behind the falling sludge, tends in conventional practice to break up the agglomerations of sludge particles.

However by operation according to this invention, the sludge flows out of the one side of the bottom edge of the lamellar channel which is now at an angle with the horizontal as a continuous and more or less uniform stream of the sludge phase; and this, combined with the compacting gained in the channel through its tilting downwardly to the right, makes a full stream of the sludge phase to fall through the aqueous phase like a stream of heavy immiscible liquid off the bottom edge of the channel at the side which is low due to the angle with the horizontal. This compacts then into a sludge mass below for withdrawal from the bottom. Usual methods of compacting the sludge before withdrawal, such as compacting with slow moving rakes or by tapping or otherwise vibrating the sides of the container may aid the operation but are not a part of the invention.

Concomittantly, the water phase, now much more free of sludge particles, has little opportunity on the left side of the stream spilling out the bottom of each channel to stir up masses of sludge, which it contacts much less than when the water phase follows the flow pattern of the sludge discharging over the horizontal edge of a conventional plate, to agitate masses of sludge falling from channels just in front or above. The clear water phase may settle upwardly to be drawn off, or it may be drawn off above and to the side of the channels toward which it has been settled.

Sometimes the plate settler or decanter is used principally for the decantation from the water phase of an immiscible liquid, here called an oil, which separates into a more or less permanent emulsion, or in a definite liquid phase, as the many drops are coalesced into a continuous layer or stream. If lighter than water this oil phase (this includes an emulsion, if only such is separable) is removed readily from the upper right of the channels between the plates, if heavier than water from the lower left.

Also, in sewage treatment, flocculent solid particles may be present or be specially formed in the same or a separate vessel, to be entrained by bubbles of undissolved gases to give them an apparent density less than that of water. They rise to the surface with such oils, lighter than water, which may be present; and the combination is drained off or skimmed off as a light layer or phase. Either as a simple decanter for decanting as a separate phase the lighter immiscible liquid, or an emulsion thereof, or for simultaneously decantation of a sludge phase also, the lamellar decanter has greater capacity and improved separating ability, when the plate pack is tilted to one side—in this example, downwardly to the right when looking down the channels from above.

The plates in the pack may be arranged so that a plane through their upper edges, which are always parallel will be nearly horizontal; or it may be perpendicular to the plane of a plate. These are also the usual alternatives as to a plane through the parallel lower edges. It is also possible to have the pack arranged so that these edges are arranged otherwise—usually between these two extremes. There are obvious mechanical advantages and disadvantages of each arrangement, depending on fabrication methods and the method of assembly of the pack in the shell or vessel. For sludge falling off the lower edges of the plates, which are on a plane perpendicular with the longitudinal axis, there is more mixing with the water phase from the channel just behind and below. Thus plates having edges on a plane which is horizontal or nearly horizontal will drop off sludge particles with less chance of mixing. With the improved channels at an angle with the horizontal, the plane of the lower edges of the plates will be tipped also by this angle, and in fact this is an advantage in operation. By cutting edges of the plates at the correct angle, the planes through the edges could be made horizontal but this has no advantage.

Plate settling or sedimentation by the improved treatment of water for domestic or industrial use sometimes is accomplished more rapidly after the addition of usual coagulation aids. Upward flow will give a solids-liquid contact with flows which have formed and are continuously being enlarged as they settle downwardly to give a high rate of discharge at the top of clear water. A separate vessel may be used for this flocculation; or sometimes it may be done in the same vessel which contains the plate settling. The operation of flocculation, the materials used, and the equipment used may be of any type known, and are no part of this invention, although they may aid its performance.

In various operations of the sanitary, chemical, and metallurgical industries, there may be the necessity of separating a fluid mixture into three phases: a continuous water phase, a sludge phase, and an oil, emulsion, or light phase. (The same plate settling may be used if the continuous phase should happen to be another liquid—an oil or water insoluble material—and and the separation would proceed as described with, however, different names for the several phases.) Either two phases or three phases, if formed, may be separated according to the present invention. The plate settler may thus discharge either two or three streams simultaneously; and there are thus several types of flow to be considered in separations by the new treatment in these lamellar channels:

(a) the mixture enters the top of the channels containing a water phase and a sludge phase; both phases flow downwardly concurrently, with the sludge phase separating to form a lower layer at the bottom; and the clear liquor drawn off somewhat above, and preferably to that side of the channels to which it had been settled;

(b) the mixture enters the top of the channels containing a water phase and bubbles of gas, or an oil phase or a froth phase may develop from bubbles of gas and flocculent solids; the water phase flows downwardly and the gas phase or oil phase (or the froth phase if it developes) settles upwardly to the top of the channel and then flows upwardly in the channel countercurrently to the water phase and separates at an upper level at the top; preferably to that side of the channels to which it had settled while therein;

(c) the mixture of three phases, water, sludge and light enters the top of the channels; the water phase and the sludge phase both flow downwardly, concurrently, and are separated as in (a); and the light phase settles and flows upwardly, and separates as in (b) from the influent mixture;

(d) the mixture enters the bottom of the channels containing a water phase and a sludge phase; the water phase flows upwardly; and the heavier sludge phase settles downwardly and flows in countercurrent to the water phase along the bottom of the channel to the bottom of the containing vessel where it separates to form a lower layer.

(e) the mixture enters the bottom of the channels containing a water phase and a gas phase or an oil phase (or a froth phase may develop); both phases flow upwardly, concurrently; and the light phase settles upwardly to the top of the channel and then flows upwardly and separates to an upper level at the top; preferably to that side of the channels to which it had settled while therein;

(f) the mixture of three phases, water, sludge, and light enters the bottom of the channels; the heavier sludge phase settles and travels downwardly as it separates in a lower layer as in (d); the water phase and the light phase settle and flow upwardly in countercurrent to the sludge phase; and the light phase separates from the water phase to an upper level at the top as in (e).

It has been found that in some cases where emulsions which are almost permanent in their nature are encountered of two liquids, water and oil, or of some suspensions of an inorganic powder in water, a small amount of some organic material—often colloidal in nature—is also present which prevents the total settling of the two phases in any reasonable length of time. This organic material may be susceptible to a more or less complete oxidation as described, which if controlled by the addition of the proper amount of oxygen, either partly or completely will destroy it. The large molecules of the colloid are often very readily oxidized, at least in part, compared to hydrocarbon or other oil molecules which are present. If this partial or complete oxidation is done simultaneously with the decantation in a unit consisting of the pack of plates, the emulsion is broken and a clear oil layer and a clear aqueous layer settle out.

In the Pressure-Recycling Oxidation Sewage Treatment as described in U.S. Pat. Nos. 3,772,187 and 3,788,476 the very high rate of oxidation or digestion obtained is influenced and controlled by three factors:

(a) strictly chemical oxidation, (b) enzymatically catalyzed oxidation, and (c) aerobic-bacterial oxidation.

The relative amounts of these different types of oxidation have not been determined; but the careful study of much work indicates that the first two are definitely of great importance in this treatment and may be more important than the conventionally recognized third. The solids may often be settled out simultaneously with the oxidation of organic materials; and a settler, separator or decanter removes solids as a sludge when incorporated in the same pressure vessel.

The settling of sludge simultaneously with oxidation is possible by the use of this new treatment, when used with sewage liquids; but such settling is quite impossible in conventional aeration or oxygenation treatments, wherein a violent agitation is always necessary to dissolve air or even pure oxygen into the liquid at the same time as oxidation is taking place. Such agitation obviously precludes simultaneous settling. In the present invention, oxygen is dissolved in the water phase usually but not always under pressure; prior to entering the treatment tank; and the oxygen in the saturated influent without agitation supplies COD and BOD to the organics in a practically quiet liquid volume from which sludge may be aided in settling in any conventional way. The oxygen is consumed from the solution without disturbance; and the progress of the treatment is controlled to a large extent by the amount of oxygen added to the sewage influent. If air is used, nitrogen tends to remain in solution during the oxidation along with the carbon dioxide produced. When the oxidation-settling treatment is under pressure, the depressurizing following the treatment removes gases from the water phase with great ebullition of what has been until then a very quiet liquid—but this is after the oxidation, and usually after the settling action. Particularly when pure oxygen is used, the oxidation occurs quietly to allow very rapid settling simultaneously. The total residence or detention time should be at least 10 minutes which will often suffice for the combined oxidation for chemical action and settling for phase separation, in other cases it may be longer—up to 300 minutes, when there is a very high COD and BOD. Often the desired oxidation is not secured with the amount of air and/or oxygen which can be dissolved in the one pressure-dissolution; and a part of the treated liquid and/or a part of the separated sludge is recycled back to the influent pump. Depending on the BOD and COD of the influent the recycle might be twice or several times the influent—or in oxidizing sludges more times, to a maximum of 50.

Usually oxygen and/or air are intimately mixed in the pump supplying to a pressure vessel, which may be the pressure digestor or an intermediary thereto, an influent of sewage waters from various sources or mixtures, i.e. with activated sludge, or with other fluid mixtures which are to be separated while organics are being oxidized. In other embodiments of the invention, oxygen may be added as microbubbles in a size range of 5 to 100 microns—desirably 5 to 20 microns—through any one of the several well known systems. Microbubbles may be passed directly into a preliminary dissolution tank for all of the liquid or into the pressure treatment tank, and the liquid being treated therein. The small size of the bubbles, their large total area, the absence of nitrogen all give a great driving force for the dissolution of oxygen, i.e. with oxygen at 5 atmospheres 5 times as much driving force as with pure oxygen at 1 atmos. pressure, and 5 times 5 as for the 1/5 atmos. of oxygen in atmospheric air, and then times some additional large factor because of the retarding influence of nitrogen—total may be some hundreds of times. Thus microbubbles of oxygen dissolve almost instantly to give practically no agitation when added to the bulk or plenum space of the vessel before entering the plate settler. Particularly is this so when the feed is upward through the plate settling.

Also the pressurized dissolution of air/and or oxygen into all of the liquid may be in one tank, wherein more or less oxidation takes place; with a depressurization into the plate settling, so that gas coming out of solution at the lower pressure as microbubbles at the bottom may rise to bring to the top a light phase of bubble entrained solids and/or oil. Or the pressurizing tank may dissolve into all of the liquid the oxygen from air and/or oxygen and the oxygen rich solution may be passed then to a pressure vessel zone which may allow the necessary retention time for the oxidation before being passed, still containing more or less dissolved oxygen to the plate-pack settler.

Different organic molecules have greatly different resistances to oxidation, e.g. acetic acid which has one atom of oxygen for each one of carbon is relatively stable and is probably an intermediate compound in the oxidation of many other compounds. Carbon itself and some highly carbonaceous materials are extremely stable and thus the less stable compounds adsorbed on activated carbon may be oxidized off in some cases to effect a regeneration.

ACCOMPLISHMENTS OF THE INVENTION

The objects desired and the results which have been achieved by this invention, as have been indicated above and will be explained more fully hereinafter include:

1. The decantation under atmospheric or higher pressures of a light phase of gas or oil or froth from a fluid mixture containing also a continuous aqueous phase during an improved settling, while the fluid mixture is passing through channels between plates which are tilted downwardly to one side;
2. The similar settling under atmospheric or higher pressures of a sludge phase;
3. The simultaneous treatment as in (1) and (2);
4. The treatment as in (1), (2) or (3) when the continuous phase is an oil phase; and a water phase may be separated in a heavy phase or a light phase depending on the density of the oil phase;
5. The decantation as in (1) with a simultaneous oxidation of organics from a waste liquor as sewage;
6. The settling of a sludge as in (2) with a simultaneous oxidation of organics in sewage liquors either raw or from other processing;
7. The simultaneous operation of (5) and (6);
8. The more rapid and complete separation of solid and/or light phases of sewage and other waste liquids, sometimes with the supply of the COD and BOD requirements of the organics in such waste liquids.

BRIEF DESCRIPTION OF THE DRAWINGS

Each of the several figures are diagrammatic in showing the essentials of the improved form of plate settling and some of the forms of the plant which may be used for its operation and accomplishment. No scale is used; and details of design are not indicated, since the pictorial representation is schematic of the function of use rather than a blueprint for equipment construction. Thus some valves and other conventional accessories are not indicated, as their use would be common practice necessary in this type of operation.

While other angles are possible, the angle of inclination of the longitudinal center line of the plates and channels with the vertical is, in each case, 30°. Except in FIG. 1., the angle of tilt of the channel with the horizontal is 5°.

PLATE SETTLING AND SOME FLUID TREATMENTS THEREWITH

The mechanical design and methods or fabrication of the equipment used for the plate settling in the practice of this invention depend on the material of construction which in most cases would be low carbon steel, although other sheet materials may be specified for special cases. Methods used for the design and fabrication of component parts, and assembly by welding, bolting, or other means, would be those conventional for such work. No exact designs are specified; the ability to operate functionally of the several parts individually, and of the unit as a whole is the primary requirement; and the invention does not comprehend design details familiar to builders and users of comparable equipment.

There are many uses for plate-settling to separate two or three phases of a fluid mixture, particularly by this improved treatment. One of the basic uses is the settling for removal of suspended solids—either with or without addition of agents to increase coagulation and/or flocculation of many potable and industrial water supplies. Other and more specialized uses are in liquid-liquid decantation, sewage treatment, also separation of slimes from chemical and metallurgical industries. One important application, of more recent use, is the separation of the particles from slurries which result from the washing or scrubbing of air, stack gases, or other gas polluted with particles so small as to be carried on by the gas stream. These slurries are frequently encountered where dust, fly ash, or other fines are supported in air and must be removed, usually by spraying with a liquid, which may also interact with some noxious material present. The slurry must then be dewatered before it, in turn, can be discarded.

While water is the usual continuous phase or the carrying liquid encountered, the phases of solids, liquids, and/or gases present in liquid mixtures may be separated equally well and by the same improved plate settling when the carrying or continuous phase is an oil or other liquid.

In many uses, the pack of plates which allows the improved plate settling of this invention may be installed in an enclosing vessel of quite varied shape and size or even in a hole in the ground or well with lined walls which is supplied with the liquid mixture to be treated. It may also be installed fully submerged in a stream or other body of liquid with suspended solids—or it may be suspended so that only the lower openings of the channels are beneath the surface of the turbid liquid, and with the liquid drawn up through the channels and out as effluent by suction. In those cases where operation under super-atmospheric or sub-atmospheric pressure is desirable or necessary—as in the combination under pressure of the oxidation-settling of sewage waters—an entirely enclosed unit is usually indicated, preferably in a cylindrical pressure vessel. This does not preclude other shapes and even open tanks for the plate-settling operation, particularly when conducted under atmospheric pressure, as the oxidation process may be proceeding simultaneously under some circumstances.

Counter Current Decantation

The improved plate settling of the novel treatment of this invention may accomplish the separation of the heavy solid particles of slimes in the metallurgical and other industries, or the settling of preciptates from chemical processes as in many conventional flow sheets. In many cases the operation requires the washing of the particulate solids removed. This is done by reslurring them with fresh liquid usually at aqueous solution coming from a subsequent settling step, resettling, and rewashing by an additional amount of the same aqueous liquid from the following settling step and finally with fresh liquid—usually water—in two or more countercurrent reslurrying and settling operations. The solid or sludge phase is the concentrated sediment of solid particles obtained from any such operation; and the process itself in what is called a multiple countercurrent decantation, long practiced with less efficient settlers in many industries to produce as concentrated a clear liquid effluent as is possible, also to allow only a minimum of soluble material to remain in the final sediment.

Suction Operation of Plate Settling

From consideration of the operation, to be desired hereinafter of plate setling in a wall in the ground filled with circulating sewage to be treated, it has been found that the plate settling unit—or at least the lower ends of the channels—may be immersed in the waters of a muddy stream or other body of turbid water. Relatively clear water may then be drawn off by suction applied at the upper end of the plenum or discharge space of the channels, while sludge or mud will be settled down countercurrently and sidewise and dropped below and entirely clear of the unit. It will then be carried along with the current and away from the open bottom end, if the stream has sufficient velocity of flow.

With ample suction supplied by the effluent pump for clear water, there needs to be submerged only the lower open end of the channels. These are tilted from the horizontal as has been found so desirable to accomplish a rapid and efficient separation. This allows almost the entire unit to be suspended above the water surface; and, particularly, it allows usually an adequate and efficient disposal down stream of the separated solids. If the current of the stream does not carry along the sludge, it can be removed from any accumulation on the stream's bed. The channel openings for influent may face downstream to minimize undue fluid motion at these inlets also this allows the sludge which is discharging a better opportunity of being removed by the current of the stream. Suitable baffles also may be used to minimize influence of stream currents within the channels.

Check valves in the suction line of the pump will be installed just where it connects with the plate settler and other provisions will be taken to prevent drainage of the unit in case of pump stoppage or other reason for loss of suction.

In this suction operation, gases may be released as the liquid rises in the channels during the settling; and to prevent increase of veocity and poorer separation of a rising and floating froth of sludge the plates may be separated so that they are further apart near their outlets, i.e. the channels may be increased in thickness, uniformly, from inlet to outlet by as much as 10 to 25%. The light phase is removed by the suction of another pump.

Sewage Treatment

The plate settling treatment for phase separation may be used for waste waters which have a COD and BOD and come from municipal or industrial sources, including from, among others, food processing plants, also pulp and paper mills. These waters may be quite dilute in organic wastes as is usual with raw domestic sewage; or they may have a very much higher BOD, as do the sludges obtained by settling the solids from such domestic sewage, or waters which are even more concentrated in organic wastes, as are those from some industrial sources, as those from some food processing. Such use of the plate settling with sewage liquids may be simply as another efficient form of mechanical settler, or clarifier in many of the conventional flow sheets of such treatment, including simple sedimentation, liquid-solid contacting of flocculent precipitates, formation and separation of floating flocculent solids by entrained gas bubbles, and others.

Plate Settling and Simultaneous Oxidation in Closed Vessel

A major use of the improved plate settling is in the removal of solids from sludges simultaneously with the oxidation of organics having COD and BOD and dissolved or suspended in the carrying liquid, usually sewage or some aqueous stream associated with its treatment. Oxygen as such, air, or mixtures of the two may be supplied to a influent supply pump (preferably centrifugal) wherein the air and/or oxygen is violently mixed and dissolved; or micro-bubbles may be supplied in a range of diameters from 5 to 100 microns, preferably 5 to 20 microns. These may be made by any of the conventional means for this purpose, and added directly into the body of the liquid in the tank in which the treatment takes place, in the pump suction, or into a dissolving tank handling all of the liquid, and before the treatment tank. This may be at atmospheric pressure; although as explained above, a much greater concentration and activity of oxygen—and a much shorter reaction time in reduction of COD and BOD is realized when a pressure above that of the atmosphere - preferably 0.5 to 10 atmospheres gage is used to saturate the waste waters. The recycle of treated liquid and/or of sludge formed to allow further supply of COD or BOD has been explained above.

Regeneration of Active Carbon

Water carbons are those activated carbons, often in a fine or pulverulent form, which are used to adsorb impurities from aqueous liquids. In sewage liquids, this is after most of the suspended solids or organic materials which can be aerobically digested readily are removed. The regeneration of the carbon is expensive and require separation from the liquid, drying, heating to a high temperature, then cooling and replacement. Carbons used in some industrial processes and in some sewage treatments can have at least part of the adsorbed material destroyed or removed by selective oxidation to give a lesser weight of organic material on the particles. The process of the present invention is carried out on a suspension of the particles of spent carbon in from 5 to 50 times as much water. Again, in the presence of bacteria, enzymes, and highly concentrated oxygen from pressure saturation, it is impossible to know the relative effects of the strictly chemical, the enzymatic, and the bacterial reactions on the oxidation or partial oxidation of the molecules adsorbed on the carbon particles.

Plate settling, either in the pressure vessel of the oxidation step, or in a subsequent vessel under atmospheric pressure, allows the concentration of the carbon to become a dense phase. It then may be recycled for from 2 to 50 times as has been the sludge in other processing so as to elimate still more of any adsorbed organic material. The same water or fresh water may be used to make the suspension. Finally, the reactivated carbon may be washed by counter current decantation as described above to ready it for reuse. The holding tank for the activated carbon treatment may be used for the pressure oxidation in situ with recycling upflow of oxygen-saturated, pressurzied water and a plate-settling of any carbon particles carried over.

Use of Hydrostatic Head Above Ground Level

In those cases where pressure operation is desired, as for the Pressure-Recycling-Oxidation Sewage Treatment, the desired pressure may be secured in a pressure zone near the bottom of a relatively tall—50 ft. to 100 ft. or more—vertical tank, usually of cylindrical cross section. Influent carrying oxygen may be pumped in near the bottom, or the air and/or oxygen may be added as microbubbles in the pressure zone of the vessel itself, or in a preliminary dissolving tank for the liquid. The tank may be open at the top; and any gases dissolved under the hydrostatic pressure near the bottom may reach their solubility limit and come out of solution as bubbles as the liquid rises and approaches the top. These bubbles may in particular be of residual nitrogen, if air is used to supply oxygen; or they may contain oxygen if more air is added than is needed or can be used in the oxidation. These very fine bubbles may contact and adhere to flocculent particles of solids, so as to entrain them because their new effective density is less than that of water. Thus they rise to form a froth phase to be skimmed off at the top. Effluent of treated liquid will be withdrawn somewhere lower.

Use of Hydrostatic Head Below Ground Level

Also the necessary pressure to allow the greatly increased solubility of oxygen may be secured in the same way by using the hydrostatic head or pressure in the lower part of a pit or well filled with liquid to an overflow point above ground level. The plate pack is suspended in the liquid; and settling in the channels may be secured either in the downgoing stream of liquid descending into the depths of the pit, or in the ascending stream. If air is used for the oxidation, it may be applied either in the influent pump or in micro-bubbles supplied at some level below the top in the conduit of the downgoing stream; and these are carried down and then up. The nitrogen comes out of solution as small bubbles, as the hydrostatic pressure is reduced as the stream rises in its conduit. These small bubbles will adhere to sludge particles and thus float or entrain the sludge if it is agglomerated and flocculated, by known methods. The sludge will be carried as a froth phase upward through the channels for separation from the bulk of the water there, thence to the top for removal by skimming off or otherwise. Any heavy sludge settling to the bottom of the well is pumped up by a sludge line dropped down from the top.

Use of Separate Vessels for Dissolving Oxygen

Various methods for dissolving air and/or oxygen in pressurized waste waters have been practiced. The water coming from such a vessel without settling of the suspended solids may have more or less of its dissolved oxygen utilized, and then be passed with substantially lower COD and BOD through the plate settling. Here is the separation by a downward settling of heavy sludge, and/or the upward settling of a light phase of oil or a froth of gas and solid phase sludge, which may be floated to the surface by entrained gas bubbles which have come out of solution. During the settling, there is continued oxidation taking place.

GENERAL DISCUSSION OF THE PLATE SETTLER

In the preferred unit for conducting the plate settling, the slope or inclination with the vertical of the longitudinal median of the channels of flow, and of the plates, may be 15°–75°, shown here arbitrarily in the figures as 30°. The length of the plates may be 5–8 feet, most often; but some separations may require a length of only 3 feet while others give a better separation with a length of up to 10 feet. The distance at right angles between plates, or the effective thickness of the channel, is between about $\frac{1}{2}''$ to $2\frac{1}{2}''$. The same thickness of the channel is maintained across the width at each cross section at a point on the longitudinal axis.

In some few cases e.g. where there is an expansion of a gas phase due to lesser hydrostatic pressure in bubbles going upwards during a plate settling, it may be advantageous to increase the cross section of the channel from the lower end to the upper end. Usually this increase of thickness of the channel will not be greater than 10% to 25% from the lower end of the plates to the upper ends. The channels, although expanding, and the plates all will have the same width and almost the same length as is convenient for construction, thus the form of the plate pack for this case will be that of a truncated pyramid always of the same width.

For receiving and discharging liquid to and from the channels, there is a plenum space or reservoir above and below the pack of plates. This allows also further sedimentation and clarification of the liquid. Particularly, the residence time may allow time for oxidation of organics to take place by strictly chemical, enzymatic and/or bacterial actions, when such oxidation is also a part of the sewage treatment.

In each case, the zone of pressure, when used in the settling-oxidation sewage treatment, for securing the benefits of pressure dissolution of oxygen may be from $\frac{1}{2}$ to 10 or even more atmospheres gage pressure-most often 2–5 atmospheres gage pressure. The vessel assembly is then designed and fabricated for service under such pressure when so used. In most other cases the plate settling is done at atmospheric pressure.

DOWNWARD SETTLING OPERATIONS

Figures 1, 2, 3A, 3B, 3C, 3D, 4A, 4B, 5, 6:
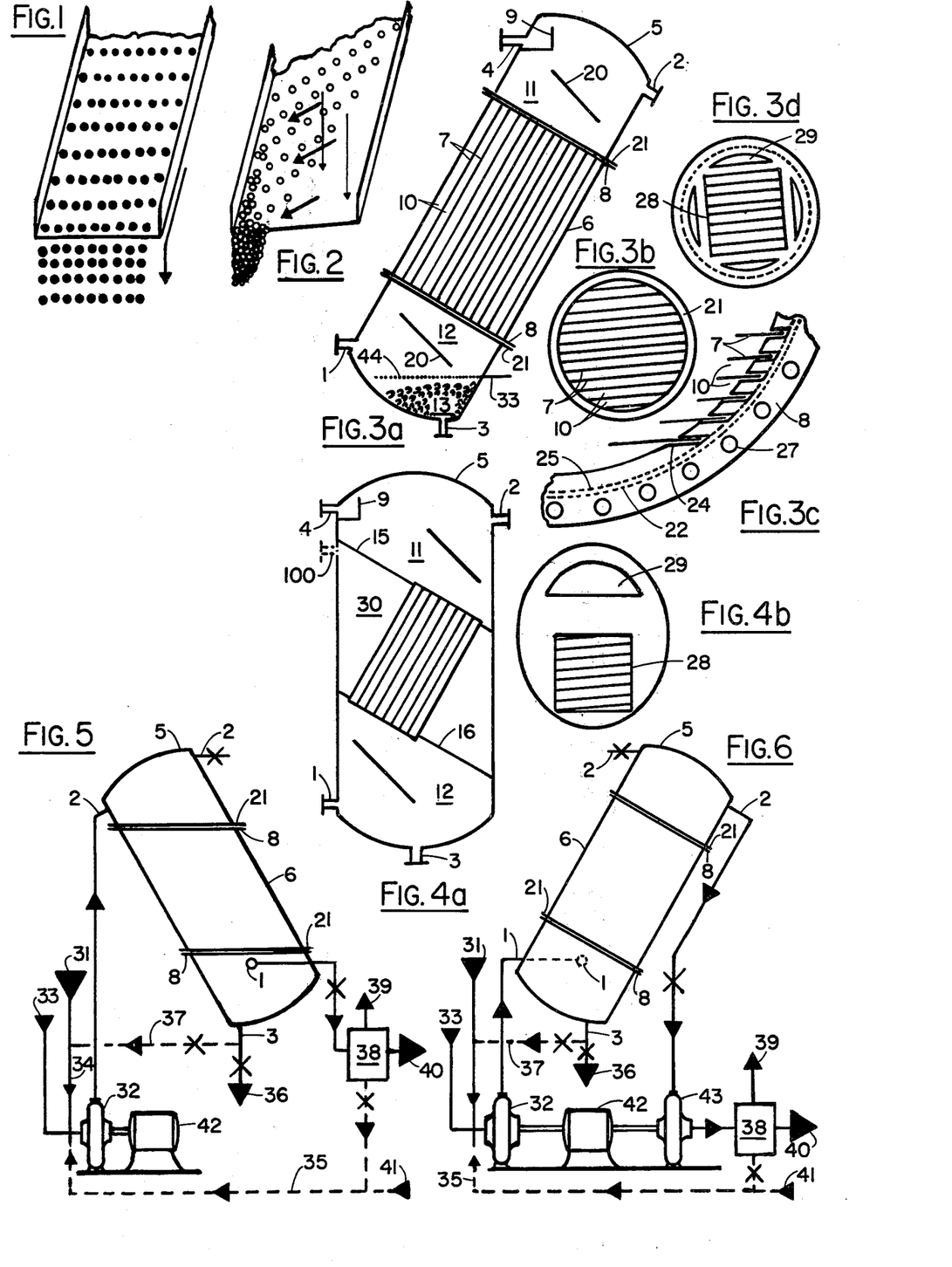
FIG. 1 is a schematic of the flow pattern of individual particles of solids which collectively form a sludge for separation in the conventional plate settling with the channels of flow at right angles to their longitudinal axis. The plate forming the upper boundary of the channel is not shown.
FIG. 2 is a schematic of the flow pattern of particles of solids when the channels of flow—and the plates which bound them—are tilted downwardly on the left when looking upward from below. The plate forming the upper boundary of the channel is not shown.
FIG. 3a diagram a cross section of a vessel as a cylinder, containing the plate settling channels, with its axis at an angle with the vertical, and having on its axis the plate pack as an integral longitudinal section thereof.
FIG. 3b is a view inside the containing vessel at the plane of the discharge of the channels of flow of FIG. 3a, which channels are tilted downwardly to the left, looking upwardly from below.
FIG. 3c is an enlarged detail of the flange of the section of the plate pack showing this flange, from the same viewpoint as FIG. 3b, as illustrative of one method of supporting the plates.
FIG. 3d diagrams a cross section inside the cylinder having its axis at an angle to the vertical and containing the settling operation, and the plate pack with a rectangular cross section and tilted so that the angle of the plate pack and of the cross sections of the channels of flow therein are tilted at an angle with the horizontal.
FIG. 4a diagrams a vertical cylinder, with an internal plate pack having a rectangular cross section and an axis at an angle with the enclosing cylinder and with the vertical so that channels of flow and plates are at an angle with the horizontal.
FIG. 4b is an elevation of a flange for supporting the plate pack of FIG. 4a, with the channels of flow at an angle with horizontal.
FIG. 5 diagrams the Pressure-Recycling Oxidation Sewage Treatment in the plate settling of the unit of FIG. 3a and capable of operating under a pressure above atmospheric, with downward flow of liquid and concurrent sludge settling, also the recycle of treated liquid and sludge, while simultaneously oxidizing organics in the liquid being treated.
FIG. 6 diagrams the Pressure-Recycling Oxidation Sewage Treatment in the plate settling accomplished in the unit of FIG. 3a and capable of operating at a pressure above atmospheric with upward flow of influent and countercurrent sludge settling, also with upward settling concurrently with respect to the water phase of a light phase of froth or oil and a recycle of treated liquid and sludge while simultaneously oxidizing organics in the liquid being treated, and with the recovery of the energy used in pressurizing the liquid influent.

FIG. 1 is a schematic representation of the flow pattern in a single conventional lamellar channel with downward concurrent flow of both a water phase and a sludge phase, (as in FIG. 5). This is looking upwardly from inside the lower liquid plenum or receiving space; and the plate forming the upper wall of this channel is not shown. The entire channel is filled with liquid being treated; and the flow lines of both the water phase and the sludge phase are parallel to the longitudinal center line and the sides of the channel. The individual particles which make up the sludge are represented by dots; and each horizontal row of 9 dots may represent the positions of the same 9 particles at 9 different time intervals as the flow goes down the channel. For convenience the flow lines, which are parallel to the sides, may be called lanes.

(The slope of the center line of the channel does not represent a component of the rate of flow therethrough with reference to the relative settling rates and the patterns of the flow of the two phases, since the rate of overall flow is entirely controlled by the rate of supply of influent and of the discharge of effluent.)

Because of the short distance of vertical motion of a particle in settling which is necessary for it to reach the bottom of the channel, this component of sludge particle direction will not be indicated in this representation. The top row of dots represents the position at the start of the first unit of time—the second row of dots represents the positions of the same particles after the first unit of time, the third row from the top represents the positions in the channel of the sludge particles after the second unit of time, etc. Considering the width of the channel left to right, the flow is uniform. Thus the movement of the sludge particles is in streamline with that of the water phase from the top of the channel to the bottom; flow lines of both water and sludge are therefore parallel; and sludge particles always remain in the same lane or distance from a side of the channel.

The flow of sludge from the bottom of the channel tends to be vertical after it spills over the edge of the lower plate into the lower plenum; but it may be disturbed, particularly by the flow of the water phase which discharges against it from the channel immediately behind and below; and the sludge may be somewhat dispersed. Thus instead of being held together to fall to the sludge layer below in the straight line pattern indicated, the sludge particles may be mixed again with more of the water phase. This agitation to reduce phase separation is important, but cannot be analyzed readily.

SIDEWISE SETTLING OPERATIONS

FIG. 2 is a schematic representation of the flow pattern of a part of a lamellar channel which, according to the findings of this invention, has been tilted downwardly on the right side, when looking downwardly from above. Thus it is tilted downwardly on the left side when looking up from inside the lower liquid reservoir, as here shown; with its lower edge, i.e. the lower plate, at an angle with the horizontal. This gives an unexpected and significant improvement as compared to conventional plate settling as diagrammed in FIG. 1. Again the plate forming the upper part of the channel is not shown; and again the entire channel is filled with the liquid being treated. The line of the steepest angle which could be drawn on the lower plate would now be a resultant of the angle of the longitudinal axis with the vertical, and of the lower edge with the horizontal.

The sidewise tilt in addition to the longitudinal angle of the channel with the vertical, increases the effectiveness of gravity which acts on all of the material flowing in the channel, and the like most settlers, this depends on gravity. Gravity exerts, however, a greater force on the solid particles, because their density is greater than that of the water phase. Gravity thus draws the sludge phase more to the lower side of the channel in preference to the water phase; and the sludge flow pattern now veers toward the sides as indicated by short, heavy line arrows, from that of the bulk flow.

The paths of the sludge particles may be indicated again by the rows of open dots which again represent the positions of individual solid particles at successive intervals of time. These rows of dots are not parallel to the sides of the channels, nor to the flow of water, but are at an angle thereto because of the tendency of gravity to force the particles toward the lower side of the channel, depending on the difference of densities of solids and liquids and the angle with the horizontal of the centerline of the channel left to right.

The number of particles in the top angular line of flow is diagramed again as 9, representing, for example, 9 lanes. The bulk flow is down the channel—at first parallel to its walls. However by the end of the first interval of time, the position of the first row of particles has come down to the second row of dots from the top. In this interval of time, because of the tendency for a particle to be drawn toward the left (looking up the channel), it is assumed that all particles move one lane to the left—the right hand lane has now lost its particle to the next lane, that to the next, etc., and the flow in the lane at the far left has accumulated one particle.

After another interval of time, the bulk flow has moved the particles to the positions in the third row down, all particles will have moved again one lane to the left—and, schematically, the two right lanes are now free of particles. Again, another particle adds to those in the left lane. This process continues while particles concentrate as fully as possible in the left lane, or lanes; and the lanes on the right become increasingly free of particles. Thus sludge particles end up mainly on the left and the lower part of the channel, representing a much better sedimenting operation than that of FIG. 1. There the sludge particles were merely brought to the bottom of the channel and to the spill over of its bottom edge, with uniform distribution left to right.

When the sludge of FIG. 2 discharges from the bottom of the lamellar channel to the lower plenum, it forms a definite stream with much less tendency to be dispersed by the motions of the carrying liquid, particularly, with respect to those motions due to the discharge of the next lower channel. This discharge impinges directly on the back of this stream of both sludge phase and liquid phase from the single channel which is represented in FIG. 2. Also each lower channel has a highly concentrated flow or stream of sludge on the left, which flows into the stream of sludge from each higher one.

The water phase in coming down the channel tends to flow parallel with its sides—since the channel always flows full. However, the greater gravitational pull on the solids tending to make them flow away from the streamline of FIG. 1 and toward the lower left side is due to the relatively greater density of the sludge solid phase compared to that of the liquid phase; and this settling of solids to the left must displace an equivalent volume of water phase from the lower side to the upper side of the channel.

Usually the volume of solids present in the influent is small compared to that of the liquid. Nevertheless the slight displacement of the water phase upwardly in the channel to compensate for the displacement downwardly of the sludge phase makes the liquid veer slightly to the right of its normal course parallel with the channel walls. This is exaggerated in FIG. 2 by the angle of the arrows drawn with light lines to show the direction of liquid phase flow veering slightly to the right of the sides of the channel and of the stream lines of FIG. 1. The water phase thus flows very nearly free of solid particles, particularly on the right and next to the higher plate representing the roof of this channel. It joins, after leaving the channel at the edge of the lower plate, the clear liquid from the channels above and below. It may be withdrawn from the right side of the lower plenum since that is where it is most free of suspended solids.

Simultaneously the sludge phase discharging into the lower plenum joins that from channels above and below, which has also been displaced to the left in this view. The streams of sludge from all channels come together on the left in FIG. 1 with little contact with, and hence dispersion by, the clear water phase, also the discharge to the right of the several channels. A clean separation of each stream is thus obtained, particularly if the sludge phase is withdrawn from the left side and below the channels, where it is most concentrated.

PRESSURE PLATE SETTLING—CYLINDRICAL PACK

FIG. 3a is a diagram of the longitudinal cross section on its axis showing the channels, 10, formed by the plates, 7, of the pack comprising the plate settler, 6. The plate pack, 6, essentially an assembly of parallel plates, may be of any convenient cross section. Often it will be a rectangular, box like structure. Chambers (plenums) for receiving or dividing the liquid mixture being treated from, or to, the channels are essential; and both would be attached to 6 unless the lower end of the channel is in an open body of such liquid.

The plate pack, 6, of FIG. 3a shows the plate pack, 6, as an assembly of plates, 10, with their upper edges and their lower edges in planes perpendicular to the longitudinal axes of the plates, the pack, and the vessel, 5; and this arrangement has advantages in fabrication and in some uses. However, other advantages may accrue if the respective planes of the top and bottom edges are horizontal as is shown in FIG. 5.

When the plate settling is to be an operation under pressure, as in FIG. 3a, it may be incorporated as one cylindrical part or length of the same cross section as that of the pressure vessel, 5, having plenum chambers above and below the plate settler for liquid influent and effluent. These volumes allow hold up time or residence for additional settling or flocculation; and also for reaction if settling is accomplished simultaneously with the oxidation of organics. These capacities are in th plenum chamber section, 11, above the plate settler, and in the plenum chamber section, 12, below the plate settler. The volume of these plenum chambers, hence the time of residence of fluid therein as related to the time of settling in the channels, 10, may be varied within a view range by changing the lengths of these sections, 11 and 12. Usually the vessel and its components would be fabricated in a boiler shop, principally of carbon steel, and according to the best conventional practices of welding and machining for such work depending on what the design pressure may be. However, plates may be of fiber glass or other suitable material, and other component parts may be of materials and have construction details to accomplish satisfactorily the treatment described.

Nozzles i.e. connections to the vessel wall, are provided for influent of waste water, 1, and for effluent, 2, of treated water when the unit is operated with upward flow through the channels, 10, of the water phase and downward or counter current flow of the sludge phase, as in FIG. 6 and explained hereinafter. These nozzles have their functions reversed when the unit is operated as in FIG. 5; and the influent then enters at nozzle 2 and the effluent leaves at 1, to allow downward flow of the water phase through the channels, 10, of the plate settler, 6, which is then concurrent with the downward flow of the heavier sludge phase. Baffles, 20, in both plenum chambers, the upper, 11, and the lower, 12, prevent undue agitation at the inlet or exit of the lamellar channels by the influent or effluent on the liquid being treated.

The settling operation in FIG. 3a is as diagrammed in FIG. 2, and is greatly accelerated by the tilting of the channels, not shown in FIG. 3a, but shown in FIG. 3b. Sludge settles, as at 13, to be withdrawn at nozzle 3; and its further compacting before withdrawal may be aided by any conventional means, which depends on gentle stirring and compression. Thus with the conventional set of slowly rotating rakes and/or rakes, an enlarged conical bottom section will be provided directly beneath which receives sludge settling from 12 and discharges it at 3. Compacting is also obtained by vibrating or tapping continuously that section of the vessel wall, 5, where sludge accumulates, and by the use of a standard "reel" or "picket fence" open type of slow moving agitator which presses the particles together.

The main function of the plate settler proper, 6, may be usually the separation by settling of the solid sludge phase from the aqueous phase. However, it will also coalesce oil droplets, allowing them to settle upwardly and finally to be decanted. The oil may be obtained either alone or as part of a froth phase, which may be made up of an emulsion of the water in oil, together with any flocculent solids which may be suspended and floated by the adherence of small bubbles of gases released from solution in the water phase. The decantation of an oil phase from the water phase may be the principal—or indeed the only—function of the settler, if no solid particles are present in the influent, or formed in the unit by the oxidation of organics in solution therein. Or both upward settling of a light phase and downward settling of a heavy sludge phase may be accomplished simultaneously from the bulk, water phase. The water phase then is regarded as an intermediary phase.

The skimming weir and trough, 9, at a high point of the shell, 5, separates such oil and/or froth which may be discharged through nozzle, 4, along with any other gases which may come out of solution during the settling—and oxidation, if such takes place simultaneously. Here again there may be used such conventional means of accelerating the final skimming from the water phase of light sludge, froth, or oil. These may be rakes, moving belts, or other devices which are standard in the industries served by this invention and hence they are not a part thereof, even though they may aid the separations which it accomplishes.

As noted above, air or oxygen may be supplied in microbubbles directly, in the treating vessel (or indeed in a separate vessel in the influent before passing it to the vessel, 5. The dotted line, 44, in the lower plenum, 12, indicates an alternative air or oxygen supply in this form from 33 a suitable source.

The positioning of the light phase outlet nozzle, 4, also of the nozzles 1 and 2, when used as outlet nozzles may be selected with reference to the discharge of the channels when going to that particular nozzle. Thus 4 should be placed on that side of the vessel, 5, toward which the channels discharge the light phase, and 2 would be placed on the side where the channels discharge the clear effluent phase; also in those cases where clear effluent is discharged at 1, it would be placed on the appropriate side of the channels' discharge.

FIG. 3b is an elevation looking at either the upper or the lower plate pack ring, 8, from along the longitudinal axis of the plate pack, 6, to show the plate flange, 8, with an enlarged detail of part of it shown in FIG. 3c.

The plates, 7, and the channels, 10, are shown here at a 5° angle with the horizontal, and when looking upwardly this is inclined down to the left. From the top downwardly, this would be down to the right.

Plates, 7, are flat, as shown here; and in most cases they are parallel to each other to give the channels a uniform thickness from end to end. When the cross section of the plate pack is cylindrical, the edges and the cross sections of the plates are parallel chords of a circle; and the left and right edges will be bounded by the cylindrical wall of the vessel. Thus the channels will not have the uniform thickness at the sides, but this does not interfere significantly with the operation. As noted above, in some cases, it may be preferable to have the channels of flow increase slightly in cross section with the length. This may impose fabrication difficulties when the plate pack is cylindrical in cross section, and is not indicated in the figures.

Numerous mechanical designs are possible, the one indicated is only illustrative; and it is in no way a limitation of the use of the invention.

The shell of the plate pack, 6, has an inner wall shown by the dotted line, 25, in FIG. 3c and an outer wall by dotted line 22; the wall may be welded to top and bottom flanges, 8, which have slots, 24. Identical flanges, 21, but without the slots, are welded to the top and bottom sections of the shell. Flange rings, 8, are constructed to mate with gaskets and bolts (not shown) through bolt holes, 27, to flanges, 21, on the top and bottom shell sections. Slots, 24, are cut in 8 to accommodate the parallel plates, 7, which are exactly the same length as the distance, face to face, of the flanges, 8. The slots support the plates at the appropriate positions; in this illustration at an angle with the horizontal of 5°. These slots, 24, are cut into the plate-rings, 8, so deep that their bottoms are at the dotted circle, 25, representing the inner wall of the shell, 6. Since the inner wall of the flanges, 21, is the same diameter as of 8; and flanges, 21, have no slots; when they are mated against flange rings, 8, flanges, 21, hold the plates in place by pressing against their corners.

The plates, 7, are cut so that each of their widths is exactly the length of the respective chord extending across to the bottoms of the two corresponding grooves, 24. A snug fit of each edge of a plate throughout its length is desired with the adjacent element of the cylindrical shell—but this joint does not need to be water tight—and there is the same pressure and same liquid on both sides. Since the boundaries of the channel on left and right are sections of the cylinder, these edges cannot have uniform thickness of the channel, as might be desired, but this does not interfere with successful operation. Thus the plates, in being assembled in the plate pack, are simply placed in the appropriate slots, and slid into place with their outer edges snug against the inner wall of the plate pack shell, 6.

In addition to the support of the corners of the plates on each edge of both sides by the grooves, 24, in 8, spacers may be provided, attached to each of the plate rings, 8, and at right angles to the plates, 7, to allow rigid support and exactly spaced separation of the plates to provide uniform thickness of the channels. As the length of the plates is usually 4-8 feet there may be suitable mid-spacers, placed on chords at right angles to the plates. Such spacers are not detailed here as they are commonly used; but one form might be a rod threaded at each end as a bolt with nuts. Short lengths of tubing of slightly larger inside diameter act as spindles or spacers, and have a length equal to the plate spacing. Other means for holding the sheets in rigid and uniform alignment will be readily apparent and may be useful in modifications of the plate settler to meet special conditions.

The plates are assembled in a bundle or pack with such spacers, fitted into the cylindrical shell, 6, to which has been welded the flanges, 8. These flanges, 8, are bolted, with gaskets to the mating flanges, 21, of the upper section, 11, and the lower section 12. Flanges, 21, have both the same inner and outer diameter as plate rings, 8, —also the same bolt holes, but do not have slots, 24, for plates. The assembly thus holds flanges, 21, tightly against the outer corners of each plate to give a firmly packed assembly. Many other means of assembly may also be used.

In this use of bolts uniformly spaced, the rotation of the plate pack, 6, and its flanges, 8, by one bolt hole on the bolt circle with reference to the shell, 5, and the bolt holes in its flanges, 21, will tilt the angle of the cross section of the channels with the horizontal a corresponding number of degrees. Thus flexibility operation may be secured by adjustment of this important angle by mating proper bolt holes of the flanges, 21 and 8. Alternatively, the whole cylinder may be rotated on its axis the desired number of degrees, if this does not interfere with the flows through the several nozzles allowing fluid flow to and from the unit.

This description of FIG. 3b is largely the same whether the ends of the plate pack, 6, and the flange rings, 8, are perpendicular to the axis of 6 as in 3a, or horizontal as in FIG. 5. If horizontal, the rings would be elliptical; but FIG. 3b, an elevation along the axis would be the same, and the grooves, 24, of FIG. 3c would be machined in flange rings, 8, parallel to the axis. In changing the angle of the plates with the horizontal then, the pack, 6, with the plates, 10, could not be rotated with respect to vessel, 5; but the entire vessel, 5, could be rotated as desired, if proper provisions were made for inlet and outlet connections.

In some plate settlers a single long shell is used for containing the top plenum section, 11, and the bottom plenum section, 12, also the plate pack, 6. The cylindrical shell may be in one or more sections. The plate pack may then be made as a unitary rigid bundle, separately assembled, which will fit snugly inside the shell when made as a single unit and slipped down from the top until it rests on a suitable means for its support.

The circular cross section of the vessel, 5, gives a cylindrical shape which is most economical of materials when the plate settler operates under pressure; but it requires various widths of plates, gives edges of the channels which are not of uniform thickness and also has some other disadvantages in fabrication although not in use.

As previously mentioned plate settling may remove the solids from an open body of turbid water, e.g. a moving stream. For such use the unit of the design of FIGS. 3a, b, c, d would have the shell of the lower plenum, 12, removed. The whole unit would be suspended then with the lower channel openings—and any additional part desired,—submerged in the stream which flows here from right to left. Suction would be applied at 2 to draw the turbid water up into and through the channels, 10, where solids settle downwardly; and clear liquid would be discharged at 2. A check valve in the pump suction line attached to 2 prevents back flow in case of a pump failure. Sludge or mud would be dropped into the moving stream under the channels and be carried away.

PRESSURE PLATE SETTLING—SQUARE PACK

FIG. 3d is an elevation of plate pack, 6, looking upward along the axis of the cylinder, 5, (as in FIG. 3b) into the channels of FIG. 3a and shows the bottom plate flange holding a pack of plates, all of the same width. The plates are tilted downwardly to the left when viewed from below, i.e. downwardly to the right when viewed from above the channels. The rectangular cross section of the plate pack preferably may be square, and is so drawn. The plates may be rigidly attached inside a square casing, 28, as a pack assembly which then is attached to and supported by plate rings, 8, at top and bottom. This configuration of the plate pack may be used when is is desirable to have plates so spaced that the channels expand by becoming thicker as the liquid passes upward through its length. This may be for upward flow of a flocculent sludge which is entrained by gas bubbles adhering to and floating the particles, for separation at the top.

The space between the square casing and the cylindrical shell, 6, in some liquid treatments should have the same pressure as that in the channels and the top and bottom liquid plenum chambers, 11 and 12. Pressure is equalized, and this space is utilized in the liquid treatment, by having several holes, 29, in both the upper and lower plate flanges to allow some part of the liquid being processed to pass through this space wherein is accomplished with somewhat less efficiency—the settling operation, also the oxidation of organics if such is involved.

Here again the plate pack may be fabricated with horizontal top and bottom; and FIG. 3d now represents an elliptical shape which has become circular in the projection. The external appearance then would be as in FIG. 5.

PRESSURE PLATE SETTLING—VERTICAL CYLINDER

Because of the large hold-up volume of 11 and 12 required by having a large volume of liquid being treated, even though the total retention or residence time therein may be only 10 to 30 minutes, the method of vessel assembly and its position and supports may be important. Thus a vertical vessel will require less ground area and have advantages in construction and use, particularly if it is built for pressure treatment as it may be when oxidation of organics occurs simultaneously with settling.

FIG. 4a shows the cylindrical pressure vessel, 5, with a vertical axis, and the plate pack, 6, again of square cross section with an axis at 30° with the vertical. FIG. 4b shows an elevation of the upper oval plate pack support or flange, 15, looking downwardly into the channels from inside the upper plenum space, 11. The same view, but upside down, would be obtained of the lower plate pack support flange, 16, when looking upwardly through the channels. In this case both the upper plate pack support, 15, and the lower plate pack support, 16, may each be cut in the elliptical shape of FIG. 4b.

The square opening for the shell, 28, of the plate pack assembly is cut as shown in the upper support, 15. For the lower one, 16, the position and size is the same but upside down. Both the plate pack supports, 15, and, 16, may be installed only loosely in the shell of 6, against liquid flow-through; and have one or more openings, shown here as a single one, 29. The inlet nozzle, 1, and the outlet nozzle, 2, are used then, as before for upward flow of the bulk of the influent; and the inlet is at nozzle, 2, and the outlet is at 1, when the bulk of the influent goes downwardly.

In this vertical cylindrical design with the symmetrical pattern of bottom sludge outflow, 13, a conventional system of rakes and/or scrapers with a slow rotation secured by an underdrive may be installed readily to compact and densify the sludge. Above this may be a gentle stirring by a "reel", or "picket fence" or other open agitator which presses together the suspended particles and agglomerates them.

A better utilization of the space between the plate pack assembly shell, 28, and the shell of the vessel, 5, is obtained if the hole, 29, is made only in the bottom plate pack flange ring, 16, and not in the top one, 15. With only 16 having this opening, 29, for circulation, and 15 being substantially tight except for circulation through the channels of the plate pack, an inlet or outlet nozzle, 5, is located through the vessel wall at the position just below 15, as shown by the dashed lines, and indicated as 100. The lower nozzle, 1, is not used. All liquid then flows in a circuit either as influent or effluent through 30, the space between the plate pack and the vessel wall, 5.

Of the many possible design modifications, a substantially vertical unit is obtained when the plate pack is at the desired angle with the vertical as in FIG. 3a. The connecting part of the upper plenum chamber, 11, is then in the form of an elbow looking up to transform it to have a vertical center line extending as high as desired, and the lower plenum chamber, 12, is an elbow looking down to transform it to have a vertical center line also as high as desired.

With the use of a vertical cylinder as a containing vessel, a plate pack, 6, with a horizontal top and bottom then fits into circular flange rings which may either fit inside the cylindrical vessel, 5, or be mated with a gasket, and bolts to the flanges, 21, on the end sections of the shell, 5.

FIG. 4a may be a diagram of a vessel of substantial height, e.g. 50–100 ft., wherein the pressure necessary for a desired increase in oxygen solubility is supplied in a lower zone by the hydrostatic pressure of the liquid above. Inflow of sewage with or without oxygen or air might be at either 1 or 100 as indicated above, with outflow of clear liquid at 2. Often the vessel, 5, may be open to the atmosphere at the top.

Also FIG. 4a may be a schematic diagram of the cross section of a well used as the treatment vessel with the ground level just below the effluent nozzle, 2, and again with influent, either with or without oxygen or air, entering at 1 or 100. If flocculent sludge which is entrained with gas bubbles is a light phase, it is removed at 9 and 4 which are slightly higher than the clear liquid outlet, 2. Any heavier, solid sludge which settles to the bottom may be pumped out by a vertical pipe dropped to the bottom.

PLATE-SETTLING AND OXIDATION—DOWN FLOW

FIG. 5 diagrams the flows of fluids in the plate settling as used in the Pressure-Recycling Oxidation Sewage Treatment. This is described in U.S. Pat. Nos. 3,772,187 and 3,788,476 and elsewhere. The plate settling operates with a downward flow through the plate pack, 6, of the pressure vessel, 5.

As shown here and as discussed under FIGS. 3a, b, and c, the upper ends of all plates and the lower ends are all in horizontal planes giving elliptical flanges, 8 and 21. Alternatively these planes may be perpendicular to the axis of the plate pack, 6, as in FIG. 3a.

Influent sewage liquid or other aqueous stream having a COD and BOD, after being screened, degritted, and comminuted if necessary, enters at 31 and passes through line, 34. Simultaneously also is ingested air or oxygen through line, 33, into the suction of a centrifugal pump, 32, driven by motor, 42. Here the air or oxygen is thoroughly mixed with and dissolved by the water as the liquid is usually pressurized to gage pressure of 2 to 5 atmospheres, sometimes, however, as low as ½ or as high as 10 atmospheres or more. Line, 34, carries the oxygenated influent through nozzle, 2, into an upper section of the tank, 5.

While this combined oxidation and settling treatment as described is basically for use under the pressure conditions which greatly increases the solubility of water for oxygen, it may be used under atmospheric conditions with plate settling. Then there might be required a substantial increase of the recycle ratio of treated liquid to influent as defined below. Under ambient pressure operation, the pump, 32, supplies to vessel, 5, now only at atmospheric pressure, influent liquid and recycle for treatment and oxygen or air.

The liquid flows down through the channels of the plate settler, 6, wherein the sludge settles out in concurrent flow as explained under FIGS. 2 and 3. Sludge accumulates at the bottom of 5 to discharge through nozzle, 3, at 36. Some part may be recycled through line, 37, back to the feed of the influent at line, 34.

The Pressure-Recycling Oxidation Sewage Treatment accomplishes, throughout the entire volume of the pressure vessel, 5, both the removal of solid particles by settling and sedimentation in the plate settling section and the oxidation of organics. Treated liquid discharges through nozzle, 1, to the degasser, 38, which is at atmospheric pressure. Gases which are dissolved at the high pressure of 5 will be less soluble at atmospheric pressure and are separated by the action in 38 due to the action of a cyclone, baffles, finally mesh demisters or other conventional devices. Treated liquid then discharges as effluent at 40.

Usually some amount of the treated liquid from 1, or from the degasser, 38, is recycled. This amount may vary from almost none at all up to several or even many times, 10 to 50, as much as is discharged at 40. It is recycled through line, 30, back to the influent at the suction pump, 32. This recycle ratio depends on: whether oxygen or air is used, the pressure used, the COD or BOD of the liquid being treated, the rate of influent, the volumetric capacity of tank, 5—hence the time of residence, the desired reduction of BOD and COD, and other factors.

While air and/or oxygen may be supplied in microbubbles inside the pressure vessel, 5, usually in the lower plenum, 12, or directly in the influent by the mixing action of a centrifugal pump, the influent may also be pumped into a separate vessel at atmospheric pressure to fill it completely. It is then saturated with oxygen or air forced in to build up the pressure to that carrying the desired amount in solution. This may eliminate much of the energy cost of pumping water, which is non-compressible, against the pressure of the treatment tank, 5. Still other methods of supplying the desired high concentration of oxygen through increase of pressure may be used to minimize energy requirements—or most of that used may be recovered as explained under FIG. 6.

In the treatment of FIG. 5 no light layer settles upwardly, and only minor amounts of gases are vented at 4.

PLATE SETTLING AND OXIDATION—UP FLOW WITH ENERGY RECOVERY

FIG. 6 diagrams the counter current settling of the sludge phase as it is being contacted by the upward flowing bulk phase of the water. Sludge settles to, and is withdrawn through, nozzle, 3, to be discharged at 36 or to be recycled in part through 37. Sludge from other sources or from other steps of processing the same sewage liquids and often activated in such treatments, may be added to the system at 41.

Any oil which is present and is lighter than water will also rise with the water phase. In this operation, if at least some air is added at 33 to supply oxygen, an amount of nitrogen which is more than its solubility in the water even at the high pressure in 5 may be present. Thus, while the oxygen combines with the organics, the nitrogen will come out of solution—along with some oxygen possibly—to appear as undissolved microbubbles which will rise in the channels.

These small bubbles, by impingement under particles of solids, adhere to those which are either naturally flocculent, or which may be made flocculent by addition to the influent of conventional flocculating agents. (The known process of flocculation and the materials and means therefore are not a part of this invention although this usual process may be conducted simultaneously, in the same vessels and may improve the separations described). Such particles as are thus buoyed by the gas bubbles; and any oils which are lighter than water, rise to the upper part of the channel on the side which is also tilted higher. This forms a light phase which is then discharged from the channels to rise still higher through 11, to overflow an interior skimmer as in FIG. 3a and then to be discharged through nozzle, 4. This treatment as indicated in FIG. 6 may also be operated at atmospheric pressure with substantially less oxygen being dissolved in the influent—hence with a much greater recycle ratio required to satisfy the COD or BOD. Some of the nitrogen from the air used and possibly some of the oxygen tends to form the light layer described and settle it upwardly for discharge at 4.

Treated liquid discharges from nozzle 2, and when operated under pressure, this liquid and the gas it has dissolved therein is passed to the inlet of a water turbine, 43, which recovers most of its available energy in expanding from the higher pressure of the vessel, 5, which may be at $\frac{1}{2}$ to 5 or even 10 atmospheres pressure gage, down to atmospheric pressure. Much of this expansion energy recovered may be not only that in pumping the water to the high pressure used to dissolve oxygen for the treatment, but also that due to the dissolution and then expansion of gases during this lowering of pressure. The expansion turbine, 43, may be on the same shaft which the motor, 42, drives the pump, 32; thus 42 must supply only the difference between the energy required to pump the liquid and the air and/or oxygen into 5, and the energy recovered by 43 in expanding the liquid and the gas evolved from solution when that pressure is lowered back to the pressure of the atmosphere. Again the expanded treated liquid and the gas therefrom may be separated in the expansion chamber, 38, the gas vents at 39 to the atmosphere; and the liquid either discharges as effluent at 40 or is recycled back to the influent through line, 35.

By the use of this water turbine or other comparable energy recovery system, there is a higher than conventional amount of energy reutilized in the pressurizing of a sewage liquid to solubilize a much larger amount of oxygen. Also the oxygen is available and used for the oxidization or organics at its highest concentration and activity, rather than being depressurized immediately as in other systems. These advantages result in part because much of the energy used in compressing the gas for its solubility is also recovered by the water turbine as the residual gases of the treatment process also expand in 43 in coming down to atmospheric pressure. Still other systems of energy recovery may be used in this and other embodiments of this invention.

Similarly in those installations where sufficient sludge is separated and discharged either at 36 or at 4 or at both, mechanical recovery of the energy available may be obtained by another expander, as 43, possibly mounted on the same shaft, as 32, or otherwise. Other sludges, activated or otherwise may enter the system at 41.

PLATE SETTLING SEPARATELY AND ENERGY RECOVERY

As previously described above and in U.S. Pat. No. 3,788,476 and particularly in U.S. Pat. No. 3,772,187, the three functions of: (a) pressurization of waste liquors to dissolve greatly increased quantities of oxygen from oxygen itself and/or air, (b) oxidation of organics in the waste liquors, and (c) clarification by settling may be accomplished in one, two, or three vessels. Thus in FIG. 6, all of these three important parts of the treatment may be accomplished in 5, as has been discussed above.

Alternatively only a part or none at all of the settling may be done in the pressure vessel, 5, if it is not equipped with the plate settler, 6, although the pressure solution and use of oxygen in supplying COD and BOD may be quite effective therein. The discharge from the water turbine, 43, for energy recovery will contain very many microbubbles of gas coming out of solution—and these may be kept from coalescing into larger bubbles by a minimum of agitation although they will have the same total expanded volume of gas. This mixture then will bypass 38, to go as directly as possible to be the influent of a plate settling from the bottom of an atmospheric pressure unit as in FIG. 3a.

Considering the treatment in FIG. 3a, the expansion of the microbubbles which come out of solution as they rise will adhere to the solids which are already flocculent or are flocculated by conventional methods, which will lower their apparent density so that they will settle upwardly and be removed in a froth phase at 4, as has been described. Part of the treated liquid which will discharge at 2, also part of sludge from 3, may be recycled to the influent of the pressurizing pump, where oxygen and/or air is added.

Again the energy recovery by 43, may be a larger part of the energy used by the pump, 32, for pumping the liquid than is recoverable by any previously suggested system.

For some reasons, it may be desirable to have the energy supplied for the pressurizing of the oxygen and/or air and of the water supplied otherwise than by the pump, 32, so that the oxygen dissolution is done in a separate vessel prior to feeding the highly oxygenated liquid into a pressure vessel where the oxidation and settling operations proceed as described under FIG. 3; and again a substantial amount of the energy used for the pressurized dissolution of oxygen is recovered from the effluent by 43.

Or, the oxidation may be done separately from the settling as just described, so that three vessels are used, one each for dissolution of oxygen, for oxidation of organics, and for settling. The high pressure might best be maintained for the first two, with energy recovery, as by 43 after the oxidation step; and the depressurized liquid then would be passed to the plate settling step with the minimum of agitation so as to take advantage of the gas flotation of the sludge as a light phase by the expansion of the very small bubbles and their entrainment of flocculent solids. Here, as in other examples, conventional flocculating agents may be added to improve this part of the processing.

Also, in conventional sewage treatment flowsheets, the plate settling of this invention under atmospheric pressure may be used as the usual primary and/or secondary sedimention steps with either conventional aeration or the described pressure recycling oxidation.

I claim:

1. The process of separation of the phases of a fluid mixture comprising at least two phases of matter, a first less dense phase and a second more dense phase, comprising the steps of:
(a) feeding said fluid mixture through a settling device comprising a flow path therewithin; said flow path consisting of a plurality of imperforate channels with open ends formed by the imperforate portions of the inner walls of said device and a plurality of generally parallel imperforate plates having a first axis oriented in the general direction of flow and a second axis oriented transversally to the general direction of flow; said first axis being at a first inclination of about 15° to 75° with a horizontal plane, and said second axis being at a second inclination of about 1° to 20° to the horizontal plane; each channel of said plurality of channels being the space between two adjacent plates of said plurality of plates, an upper plate and a lower plate, said upper plate being not less than one half inch distant from said lower plate; and because of said second inclination of said plates, each of said channels between two of said plates has a first, low side and a second high side;
(b) during the flow of a part of said fluid mixture in said channel, and because of the greater influence of gravity on said more dense phase than on said less dense phase, said more dense phase:
 (i) settles downwardly and approaches the lower of said two plates;
 (ii) flows at an angle which is not parallel with said first axis of said channel, but which veers toward and approaches the wall of said lower side of the entire cross section of said channel;
 (iii) loses some part of said less dense plate mixed therewith during its settling downwardly as it approaches said lower plate of said channel and also in its flow toward and approach to said lower side of the entire cross section of said channel;
(c) during said flow of at least a part of said fluid mixture in said channel, and because of the lesser influence of gravity on said less dense phase than on said more dense phase, said less dense phase:
 (i) settles upwardly and approaches the upper of said two plates;
 (ii) flows at an angle which is not parallel with said first axis of said channel, but which veers toward and approaches the wall of said higher side of the entire cross section of said channel;
 (iii) loses some part of said more dense phase mixed therewith during its settling upwardly as it approaches said upper plate of said channel and also in its flow toward and approach to said higher side of the entire cross section of said channel; and
(d) two streams thus are separated and are discharged from each of said channels: a first stream more concentrated than said original mixture in said less dense phase, and a second stream more concentrated than said original mixture in said more dense phase; the sum of the materials leaving said open ends of said channel being equal to that of the entire amount of said fluid mixture which enters said channel.

2. The process according to claim 1 wherein at least a part of said fluid mixture is passed downwardly through said channels; and said separation of said two phases occurs while both phases are flowing downwardly and substantially concurrently.

3. The process according to claim 1 wherein at least a part of said fluid mixture is passed upwardly through said channels; and said separation of said two phases occurs while both phases are flowing upwardly and substantially concurrently.

4. The process according to claim 1 wherein at least a part of said fluid mixture is passed downwardly through said channels; and said separation of said two phases occurs while said more dense phase continues to flow downwardly; and said less dense phase settles and flows upwardly and substantially countercurrently.

5. The process according to claim 1 wherein at least a part of said fluid mixture is passed upwardly through said channels; and said separation of said two phases occurs while said less dense phase continues to flow upwardly, and said more dense phase settles and flows downwardly and substantially countercurrently.

6. The process according to claim 1 wherein the fluid mixture comprises in addition to said first phase of matter of lesser density and said second phase of matter of greater density, a thrid phase of matter of intermediate density between said first phase of said lower density and the second phase of said higher density wherein:
(a) during said flow of at least a part of said fluid mixture through said channels, and said concentration of said phase of said greater density toward the said lower plate and the said lower side of said channels, and said concentration of said phase of said lesser density toward the said upper plate and the said higher side of said channels, said phase of said intermediate density tends to concentrate in a section of said channels intermediate between said two plates, and also intermediate between the low side and the high side of said channels; and
(b) three streams are thus separated and are discharged from said channels, a first stream more concentrated than said original mixture in said phase of said lesser density, a second stream more concentrated than said original mixture in said phase of said higher density, and a third stream more concentrated than said original mixture in said phase of said intermediary density.

7. The process according to claim 6 wherein at least part of said fluid mixture is passed downwardly through said channels; said phase of higher density and said phase of intermediate density settle and flow downwardly and concurrently and are separated and said phase of lesser density settles and flows upwardly and countercurrently to said phase of intermediate density and said phase of higher density, from both of which it is separated.

8. The process according to claim 6 wherein at least a part of said fluid mixture is passed upwardly through said channels, said phase of lesser density and said phase of intermediate density settle and flow upwardly and concurrently and are separated; and said phase of higher density settles and flows downwardly and countercurrently to said phase of intermediate density and said phase of lower density, from both of which it is separated.

9. The process according to claim 6 wherein said fluid mixture is a sewage liquid, said third phase of matter having an intermediate density comprises principally water, said second phase of matter having a higher density comprises particles of solids normally present in sewage liquids; and said first phase of matter having a lower density is selected from the group consisting of undissolved gases, a mixture of oils and solids with a density less than that of water, and a mixture of oils and solids which are entrained with bubbles of gas to give an apparent density less than that of water.

10. The process according to claim 1 wherein said fluid mixture is a sewage liquid, said first phase of matter having a lower density comprises principally water, and said second phase of matter having a higher density comprises particles of suspended solids usually present in sewage liquids.

11. The process according to claim 1 wherein said fluid mixture is passed through a multiplicity of parallel enclosed channels of flow, said channels of flow having cross sections which have as at least one side wall a section of a cylindrical wall so that said thickness adjacent to said side wall of at least a minority of said channels of flow is less than the said substantially constant thickness.

12. The process according to claim 1 wherein said separation is accomplished under ½ to 10 atmospheres gage pressure.

13. The process according to claim 1 wherein said separation of said phase is accomplished by passing said fluid mixture which is divided so that some part of it goes through each of said plurality of different channels of flow, said different channels of flow each having a width greater than its thickness and being formed between alternate ones of said adjacent plates 20° with the horizontal.

14. The process according to claim 13 wherein each of said multiplicity of said channels of flow of said fluid mixture is parallel to said channel of flow and has substantially the same thickness throughout its width and length.

15. The process according to claim 13 wherein said separation of said phases is accomplished by passing said fluid mixture so divided that some part of it goes through each of a multiplicity of different channels of flow; said different channels of flow each having a width much greater than its thickness; and said different channels of flow and said channel of flow each expanding in said thickness from the narrower end to the wider end by as much as 10 to 25%.

16. The process according to claim 13 wherein each of said channels has a lower open end and an upper open end, all of said lower open ends are immersed in a body of said fluid mixture open to the atmosphere, suction is applied to all of said upper open ends, said separation of said phases occurs while said fluid mixture flows upwardly due to said suction, and said more dense phase settles and then flows downwardly and substantially countercurrently.

17. The process of claim 13 wherein, said more dense phase comprises minute solid particles and said less dense phase comprises an original aqueous solution of a solute, and said process comprises the following additional steps:
(a) said separated stream of said less dense phase is withdrawn from the process;
(b) said separated stream of more dense phase is a sediment, I, which is reslurried with an amount of an aqueous solution separated from step (c), and more dilute than said original aqueous solution;

(c) said slurry of said sediment, I, and said aqueous solution from step (c) are separated by the process of claim 13 into a less dense phase of an aqueous solution more dilute than said original aqueous solution and a more dense phase of sediment, II;

(d) said sediment, II, is separated and reslurried with an amount of an aqueous solution separated from step (e) and more dilute than said aqueous solution from step (c);

(e) said slurry of said sediment, II, and said aqueous solution from step (e) are separated by the process of claim 13 into a less dense phase of an aqueous solution more dilute than said aqueous solution from step (c), and a more dense phase of sediment, III;

(f) said process of separation of successive sediments and reslurrying each with successively more dilute aqueous solutions of said solute is continued; and a last reslurrying is made with water; and (g) said slurry from step (f) is separated by the process of claim 13 into a final sediment of a more dense phase, which is withdrawn from the system, and a less dense phase of an aqueous solution which is the most dilute of any of those separated from any slurry made; said most dilute solution being used to reslurry the sediment in the step before the last slurry which is made with water in step (f).

18. The process according to claim 13 wherein said fluid mixture is an aqueous liquid carrying oxidizable pollutants and said pollutants are subjected to an oxidation comprising the following steps:

(a) dissolving oxygen from an oxygen containing gas into all of said fluid mixture being treated while carrying all of said pollutants originally present and while in a zone wherein the pressure is at a maximum of from one-half to ten atmospheres gage pressure, so as to increase the solubility of oxygen in said liquid;

(b) after at least some of said pollutants of all of said liquid have been oxidized while in said pressure zone, withdrawing a less polluted liquid therefrom in a less dense phase and subjecting said less polluted liquid to a depressurization, wherein some gases are desolubilized at the lower pressure; and (c) releasing from solution in said liquid and venting therefrom at least some part of said desolubilized gases.

19. The process according to claim 18 wherein further steps comprise:

(a) passing at least part of the less polluted liquid of the less dense phase, partially degassed, to form a joint stream with the influent of said aqueous liquid, said joint stream being repressurized while being passed continuously to said pressure zone, so that the solubility for oxygen in the liquid in said joint stream is increased; and dissolving more oxygen in said repressurized liquid; and (b) repeating said pressurizing and dissolving of oxygen in said liquid originally carrying all of said pollutants in an alternating cycle with said depressurizing and partial release of dissolved gases therefrom, so that said part of said less polluted liquid joining said joint stream may be not more than 50 times as much as said influent with which it is joined; and said total residence times of said less polluted liquid of the less dense phase in said pressure zone is at least 10 minutes.

20. The process according to claim 19 wherein said pressure zone is at a level sufficiently below the surface of said body of fluid mixture which is in a deep container so as to have a hydrostatic pressure in said pressure zone of from one-half to ten atmospheres gage, said fluid mixture is rising inside of said container and, at least in part, discharging from near the top of said container.

21. The process according to claim 20 wherein after at least some of said pollutants in said fluid mixture have been oxidized and while said fluid mixture is flowing upwardly, a less polluted aqueous liquid is separating as a less dense phase from said body of fluid, said less dense and less polluted liquid also is flowing upwardly as it is being depressurized due to the lessening hydrostatic head; and then it is withdrawn at a level above the level of said pressure zone.

22. The process according to claim 21 wherein said pressure in said pressure zone in which all of said fluid mixture is being treated is at least in part below the level of the surface of the ground.

23. The process according to claim 21 wherein said less polluted liquid which is separated is then depressurized by being withdrawn at the surface of said body of fluid mixture which surface is open to atmospheric pressure.

24. The process according to claim 20 wherein while at least some of said pollutants are being oxidized a less dense phase is being formed, at least in part of flocculent particles to which adhere bubbles of gas coming out of solution, as said fluid mixture is rising and the hydrostatic pressure is diminishing, thus reducing the solubility of said gas; said less dense phase is settled upwardly to be skimmed off the surface of said fluid mixture; and said more dense phase, comprising the less polluted aqueous liquid, is withdrawn at a lower level than said surface, but at a higher level than said pressure zone.

25. The process according to claim 20, wherein, while some of said pollutants are being oxidized, a less dense phase is being formed at least in part of flocculent particles to which adhere bubbles of gas coming out of solution, as said fluid mixture is rising and the hydrostatic pressure is diminishing, thus reducing the solubility of said gas; said less dense phase together with at least most of the balance of the fluid mixture is allowed to discharge from near the top of said container and to flow through and be settled in a second set of channels similar to said plurality of different channels of flow in a second container open to the atmosphere wherein said oxidation continues; and said less dense phase settles upwardly in said second set of channels in said second container to accomplish said phase separation and is skimmed off the surface of the liquid in said second container, wherein said gas is vented to the atmosphere; and the more dense phase of said fluid mixture is discharged separately containing less of said pollutants than were contained in said original fluid mixture.

26. The process according to claim 20 wherein said container is open to the atmosphere and is at least in part below the surface of the ground, said hydrostatic pressure is due to at least in part the distance of said pressure zone below the level of the ground.

27. The process according to claim 19 where said depressurization is accomplished in a water turbine, mechanically connected to a pump which forces said fluid mixture into said pressure zone, thus furnishing some part of the energy required by said pump.

28. The process according to claim 18 wherein said oxidation of said oxidizable pollutants is accomplished at least in part simultaneously with said separation of said phases of matter present in said fluid mixture.

29. The process according to claim 18 wherein at least a part of said pollutants are oxidized in said pressure zone, after which said separation of said phases of matter is accomplished at least in part substantially at atmospheric pressure.

30. The process according to claim 29 wherein some of said pollutants are suspended solids which are withdrawn in said less polluted liquid and are flocculated and are settled upwardly in said phase separation, said upward settling being aided by bubbles of said desolubilized gas which adhere to said flocculated suspended solids and float them to the surface, from which they are skimmed off and removed from the system.

31. The process according to claim 18 wherein said depressurization is accomplished so as to recover at least some of the mechanical energy originally used to pressurize said aqueous liquid and said oxygen containing gas to the pressure of the pressure zone.

32. The process according to claim 18 wherein the pressurizing of all of said fluid mixture to at least the pressure of said pressure zone is accomplished in a preliminary operation by the addition of an oxygen containing gas under pressure which forms a solution therewith, and transferring said fluid mixture now containing dissolved oxygen from said preliminary operation to said pressure zone.

33. The process according to claim 18 wherein said oxygen containing gas is added to the suction of a pump which forces said aqueous liquid into said pressure zone; and said pressure zone includes at least a part of the body of said pump.

34. The process according to claim 18 wherein at least most of said oxygen containing gas is added to said liquid after it has been pressurized to the pressure of said pressure zone.

35. The process according to claim 18 wherein at least most of said oxygen containing gas which is supplied is in the form of bubbles having diameters between 5 and 100 microns in said fluid mixture.

36. The process according to claim 13 wherein said fluid mixture is a suspension in an aqueous liquid of particles of activated carbon with organic materials adsorbed on said particles of activated carbon, said organic materials being at least partially oxidizable, comprising the following steps:
(a) dissolving oxygen from an oxygen containing gas into all of said suspension being treated while carrying all of said particles originally present and while in a zone wherein the pressure is at a maximum of from one-half to ten atmospheres gage pressure, so as to increase the solubility of oxygen in said aqueous liquid;
(b) after at least some of said organic molecules adsorbed on said particles have been oxidized while in said pressure zone, withdrawing said suspension containing said particles with a lesser weight of said organic materials adsorbed on said particles and subjecting said suspension of said particles with less of said organic material to a depressurization, wherein some gases are desolubilized at the lower pressure;
(c) releasing from solution in said aqueous liquid and venting therefrom at least some part of said desolubilized gases, and
(b) withdrawing a stream more concentrated in said particles than said original suspension, and with said particles containing a lesser weight of said oxidizable organic material than said original particles.

37. The process according to claim 36 wherein further steps comprise:
(a) making with fresh water a new suspension of a part of said particles containing a lesser weight of said oxidizable organic materials;
(b) passing said new suspension to form a joint stream with the influent of said original suspension, said joint stream being repressurized while being passed continuously to said pressure zone, so that the solubility for oxygen in the liquid in said joint stream is increased; dissolving more oxygen in said repressurized liquid; and
(c) repeating said pressurizing and dissolving of oxygen and replenishment of fresh water to make another suspension of said particles in an alternating cycle with said depressurizing and partial release of gases therefrom, so that said new suspension joining said joint stream may be not more than 50 times as much as said original suspension with which it is joined; and said total residence time of said particles of activated carbon in said pressure zone is at least 10 minutes.

38. The process according to claim 13 wherein:
(a) the lower ends of said channels of flow are open to an open body of said fluid mixture, so that said fluid mixture enters said open channels uninterruptedly and continuously throughout the duration of said process; and
(b) said fluid mixture is drawn upwardly through said channels by an uninterrupted suction applied to the fluid mixture passing through said channels, wherein said settling separates said less dense phase from said more dense phase.

39. The process according to claim 38 wherein said open body of said fluid mixture is a suspension of particles of solids in water which has a movement principally in one direction; said water is said less dense phase and said particles in a thickened sludge form said more dense phase; wherein said water is sucked out of the upper ends of said channels containing fewer particles in suspension than said origional mixture; and said particles, as a thicker sludge, settle out of the lower ends of said channels to fall into said open body of water wherein said movement carries at least part of said particles away from said lower ends of said channels.

40. The process according to claim 13 wherein said two streams, which are separated, discharge at respective points which are substantially vertically displaced and not substantially horizontally displaced from the point of influent of said liquid mixture.

41. The process according to claim 13 wherein at least part of said second stream more concentrated in said more dense phase is discharged from said channels downwardly, and is compacted further and densified in a chamber immediately below.

* * * * *